(12) United States Patent
Richard et al.

(10) Patent No.: US 11,448,501 B2
(45) Date of Patent: Sep. 20, 2022

(54) IMAGE CAPTURING SYSTEM AND A METHOD FOR DETERMINING THE POSITION OF AN EMBOSSED STRUCTURE ON A SHEET ELEMENT

(71) Applicant: BOBST MEX SA, Mex (CH)

(72) Inventors: Matthieu Richard, Remoray (FR); Francis Pilloud, Clarens (CH)

(73) Assignee: BOBST MEX SA

( * ) Notice: Subject to any disclaimer, the term of this patent is extended or adjusted under 35 U.S.C. 154(b) by 914 days.

(21) Appl. No.: 16/098,576

(22) PCT Filed: May 17, 2017

(86) PCT No.: PCT/EP2017/025131
§ 371 (c)(1),
(2) Date: Nov. 2, 2018

(87) PCT Pub. No.: WO2017/207112
PCT Pub. Date: Dec. 7, 2017

(65) Prior Publication Data
US 2019/0145760 A1     May 16, 2019

(30) Foreign Application Priority Data
May 30, 2016 (EP) ..................... 16172028

(51) Int. Cl.
*G01B 11/26* (2006.01)
*G01N 21/89* (2006.01)
(Continued)

(52) U.S. Cl.
CPC ............ *G01B 11/26* (2013.01); *G01B 11/002* (2013.01); *G01N 21/8901* (2013.01);
(Continued)

(58) Field of Classification Search
CPC ....... G01N 21/8901; G01N 2021/8908; G01N 2021/8909; G01N 21/956; G01B 11/002;
(Continued)

(56) References Cited

U.S. PATENT DOCUMENTS 5,087,822 A * 2/1992 Fairlie ................ G01N 21/8903
250/559.16
5,767,975 A    6/1998 Ahlen
(Continued)

FOREIGN PATENT DOCUMENTS

CN         1146805 A      4/1997
CN       101371131 A      2/2009
(Continued)

OTHER PUBLICATIONS

International Search Report dated Aug. 1, 2017 in corresponding PCT International Application No. PCT/EP2017/025131.
(Continued)

*Primary Examiner* — Dakshesh D Parikh
(74) *Attorney, Agent, or Firm* — Ostrolenk Faber LLP (57) ABSTRACT

An image capturing system (10), and a corresponding method, for determining the position of an embossed structure (30) on a sheet element (4) moved though a viewing area (18). It includes a camera (12) adapted for capturing a line image of the surface of the sheet element (4) in the viewing area (18), and an illumination unit (14) with a plurality of light sources (20, 21, . . . ) each adapted for illuminating the viewing area (18). The light sources (20, 21, . . . ) are arranged at different inclinations with respect to the viewing area (18). An image evaluation unit (16) determines an inclination-related parameter for the surface of the sheet element (4) in the viewing area (18) across the viewing area (18).

23 Claims, 5 Drawing Sheets

(51) Int. Cl.
   *G06T 7/00*      (2017.01)
   *G01N 21/956*    (2006.01)
   *G01B 11/00*     (2006.01)
   *G06T 7/586*     (2017.01)
   *G06V 10/60*     (2022.01)
   *G06V 10/143*    (2022.01)
   *G06V 10/145*    (2022.01)
   *G06V 10/147*    (2022.01)
   *G06V 10/75*     (2022.01)
   *G06V 30/144*    (2022.01)

(52) U.S. Cl.
   CPC ......... *G01N 21/956* (2013.01); *G06T 7/0004* (2013.01); *G06T 7/0008* (2013.01); *G06T 7/586* (2017.01); *G06V 10/143* (2022.01); *G06V 10/145* (2022.01); *G06V 10/147* (2022.01); *G06V 10/60* (2022.01); *G06V 10/751* (2022.01); *G06V 30/144* (2022.01); *G01N 2021/8908* (2013.01); *G01N 2021/8909* (2013.01); *G06T 2207/30144* (2013.01); *G06V 2201/06* (2022.01)

(58) Field of Classification Search
   CPC .. G01B 11/26; G06K 2209/19; G06K 9/2018; G06K 9/2036; G06K 9/209; G06K 9/26; G06K 9/4661; G06K 9/6202; G06T 2207/30144; G06T 7/0004; G06T 7/0008; G06T 7/586
   See application file for complete search history.

(56) References Cited

U.S. PATENT DOCUMENTS

| | | | | |
|---|---|---|---|---|
| 6,064,478 A | * | 5/2000 | Paul | G01N 21/89 356/237.1 |
| 6,166,393 A | * | 12/2000 | Paul | G01N 21/8806 250/559.08 |
| 7,969,565 B2 | | 6/2011 | Stober | |
| 8,103,085 B1 | * | 1/2012 | Zadeh | G06T 7/001 382/141 |
| 8,493,558 B2 | | 7/2013 | Asada | |
| 8,624,972 B2 | | 1/2014 | Kwirandt | |
| 9,746,426 B2 | | 8/2017 | Amanullah | |
| 2005/0046829 A1 | | 3/2005 | Clark et al. | 356/237.1 |
| 2009/0109430 A1 | * | 4/2009 | Stober | G07D 7/121 356/237.2 |
| 2013/0077851 A1 | * | 3/2013 | Ben-Ezra | B41F 33/02 382/151 |
| 2016/0103079 A1 | | 4/2016 | Moroli | |

FOREIGN PATENT DOCUMENTS

| | | |
|---|---|---|
| CN | 101726499 A | 6/2010 |
| CN | 102412170 A | 4/2012 |
| DE | 32 42 447 A1 | 5/1984 |
| EP | 2 508 870 A1 | 10/2012 |
| JP | H06-58731 A | 3/1994 |
| JP | H09-510548 A | 10/1997 |
| JP | H11-23489 A | 1/1999 |
| JP | 2001-514386 A | 9/2001 |
| JP | 2001-304835 A | 10/2001 |
| JP | 2010-112941 A | 5/2010 |
| JP | 2010-265035 A | 11/2010 |
| JP | 2012-058091 A | 3/2012 |
| JP | 2015-125069 A | 7/2015 |

OTHER PUBLICATIONS

Written Opinion dated Aug. 1, 2017 in corresponding PCT International Application No. PCT/EP2017/025131.

R.J. Woodham, "Determining Surface Curvature with Photometric Stereo," Proceedings of the International Conference on Robotics and Automation, IEEE Comp. Soc. Press, vol. 1, pp. 36-42, May 15, 1989.

* cited by examiner

IMAGE CAPTURING SYSTEM AND A METHOD FOR DETERMINING THE POSITION OF AN EMBOSSED STRUCTURE ON A SHEET ELEMENT

CROSS-REFERENCE TO RELATED APPLICATIONS

The present application is a 35 U.S.C. §§ 371 national phase conversion of PCT/EP2017/025131, filed May 17, 2017, which claims priority of European Patent Application No. 16172028.9, filed May 30, 2016, the contents of which are incorporated by reference herein. The PCT International Application was published in the English language.

TECHNICAL FIELD

The invention relates to an image capturing system for determining the position of an embossed structure on a sheet element moved though a viewing area of a sheet element processing machine and to a method of determining the position of an embossed structure on a sheet element by using such an image capturing system.

TECHNICAL BACKGROUND

The term "sheet element processing machine" is here intended to comprise any machine which is being used for processing sheet elements such as paper, cardboard or similar materials, in particular printing machines, coating machines, laminating machines and converting machines (for example cutting, stamping, folding and/or gluing machines).

An embossed structure on a sheet element is a specific area of the sheet element where its upper surface is above or below the mean surface of the sheet element. Examples are raised design elements on a box, such as letters, or the raised dots of Braille characters. Embossed structures in terms of the subject application however are not limited to these examples.

It is desirable for many reasons to be able to determine the position of an embossed structure on a sheet element since many quality checks are based on checking the position of one element with respect to another element. However, it is not an easy task to detect the position of e.g. a Braille dot on a sheet element being moved at speeds of up to 15 m/s through a sheet element processing machine.

SUMMARY OF THE INVENTION

It is therefore an object of the invention to provide a system and a method which allow reliably detecting the position of an embossed structure on a sheet element being moved through a sheet element processing machine.

In order to achieve this object, the invention provides an image capturing system for determining the position of an embossed structure in a sheet element moved through a viewing area. The system comprises a camera adapted for capturing a line image of the surface of the sheet element in the viewing area and an illumination unit with a plurality of light sources each adapted for illuminating the viewing area. The light sources are arranged at different inclinations with respect to the viewing area. An image evaluation unit is adapted for determining an inclination-related parameter for the surface of the sheet element in the viewing area across the viewing area. Further, the invention provides a method of acquiring the position of an embossed structure on a sheet element by using an image capturing system as above, wherein the following steps are performed: In a first step, a first one of the light sources directs light onto the viewing area, and the camera captures a first line image of the viewing area. Then, a second one of the light sources directs light onto the viewing area, and the camera captures a second line image of the viewing area. If desired, this step of directing light onto the viewing area and capturing a corresponding line image is repeated. Finally, the image evaluation unit determines an inclination-related parameter for the surface of the sheet element in the viewing area across the viewing area.

In general terms, the invention is based on the principle of illuminating a line of interest on the surface of the sheet element with differently positioned light sources and then evaluating the line images captured under the different illumination conditions. Due to their different positions, the light coming from the different light sources is being reflected differently from the same point on the surface of the sheet element. As a simple example, an embossed structure can be imagined which is a truncated cone, and the illumination unit is considered as comprising three light units, namely a lower one, a middle one and an upper one, with the middle one being arranged such that light emitted therefrom would directly fall into the camera if the upper surface of the sheet element was a mirror.

As the upper surface of the sheet element however is not a mirror, the light coming from the light sources is reflected in a more or less diffuse manner. Nevertheless, the intensity of the reflected light originating from the middle light source is higher than the intensity of the reflected light originating from the other light source because their light is mainly reflected to areas above and below the camera. The image evaluation unit knows that if in the three line images captured from the viewing area being illuminated by the lower, the middle and the upper light source, the intensity of the light of the second line image is the highest, then the inclination of the surface of the sheet element is zero.

If the above mentioned exemplary embossed structure (the truncated cone) is moved into the viewing area, there will be a series of captured line images in which the line image of the viewing area illuminated with the lower light source has the highest intensity. This is interpreted by the image evaluation unit as an indication for the inclination having a certain value which is different from zero (and here defined as being positive).

If the truncated cone has been moved further into the viewing area so that its center is being illuminated, it again will be the line image corresponding to an illumination with the middle light source which will show the maximum intensity of reflected light. The image evaluation unit understands that the inclination of the surface is back to zero.

If the truncated cone has been moved even further into the viewing area, there will be a series of captured line images in which the image of the viewing area illuminated with the upper light source has the highest intensity. This is interpreted by the image evaluation unit as an indication for the inclination having a value which is different from zero, namely negative.

By evaluating the series of captured line images, the image evaluation unit is able to determine the position of an embossed structure. Obviously, the activation of the light sources is synchronized with the camera (the time an image is being captured), To this end, a synchronizing module can be used. Furthermore, the activation of the light sources and also the capturing of the images is linked to the movement of the sheet elements.

In the system and the method according to the invention, an inclination-related parameter for each of a plurality of locations in the surface of the sheet element is obtained by determining for each of the plurality of the light sources an intensity value of light reflected by that location.

Specifically, (i) an array of inclination-related parameter data corresponding to an area of the sheet element is generated, (ii) a subset of the inclination-related parameter data corresponding to a feature of the embossed structure is identified, (iii) the position of the feature of the embossed structure in the sheet from position data associated with subset of the inclination-related parameter data is determined.

According to one embodiment of the invention, the light sources are identical as regards the wavelength of the light which they generate. This requires activating the different light sources one after the other and capturing line images for each illumination condition as it otherwise would not be possible to determine which light source results in a maximum intensity of the light reflected towards the camera.

According to an alternative embodiment, the wavelength of the light generated by each light source is different from the wavelength of any other light source in the illumination unit. This allows activating the different light sources simultaneously under the condition that the camera has several wavelength channels with each wavelength channel being set to each wavelength used for the light sources. The camera is a so-called hyper-spectral camera, meaning that the camera is able to relate a measured intensity with a specific wavelength.

Preferably, each light source consists of a plurality of LEDs arranged adjacent each other. This type of light source can be switched on and off at the desired frequency (in the order of up to 20 kHz) and generates only little lost heat.

It is possible to arrange all light sources on an arc which is centered to the viewing area. Thus, all light sources have the same distance from the viewing area in order to ensure that the intensity of the light directed onto the viewing area is identical for all light sources. It is however preferred to arrange the light sources in the same plane as this greatly reduces the effort necessary for combining the light sources into an illumination unit. If necessary, the intensity of the light directed by each light source onto the viewing area can be appropriately adjusted by a control energizing the LEDs.

In order to ensure that the light generated by the plurality of the LEDs has generally the same radiance when viewed from the viewing area, it is preferred to associate a diffuser to the illumination unit.

As the viewing area basically is a line of interest, the camera preferably is a line camera. This results in the amount of data to be processed by the image evaluation unit being moderate. It however is also possible to use an area camera (2D camera).

In view of the camera being preferably a line camera, the term "line image" is being used here when referring to the images captured by the camera. If the camera however is an area camera, the line image captured by the camera does not consist of a single line only but of a plurality of lines.

The inclination related parameter can be a value indicating the inclination of the surface of the sheet element at a particular point. Other examples of the inclination-related parameter are an indication of which light source resulted in the highest light intensity, an indication of the intensity being above or below a pre-defined threshold or an indication of a grayscale value of the intensity.

When determining the inclination-related parameter, the image evaluation unit preferably compares data extracted from the captured line images with data stored in a look-up table in which empirically obtained data is stored which indicates the relation between a specific intensity profile and the inclination and/or contour of different embossed structures.

BRIEF DESCRIPTION OF THE DRAWINGS

The invention will now be described with reference to a preferred embodiment which is shown in the enclosed drawings. In the drawings, FIG. 1 schematically shows in a side view a quality control station of a sheet element processing machine in which an image capturing system according to the invention is implemented.

DESCRIPTION OF EMBODIMENTS

Figure 1:
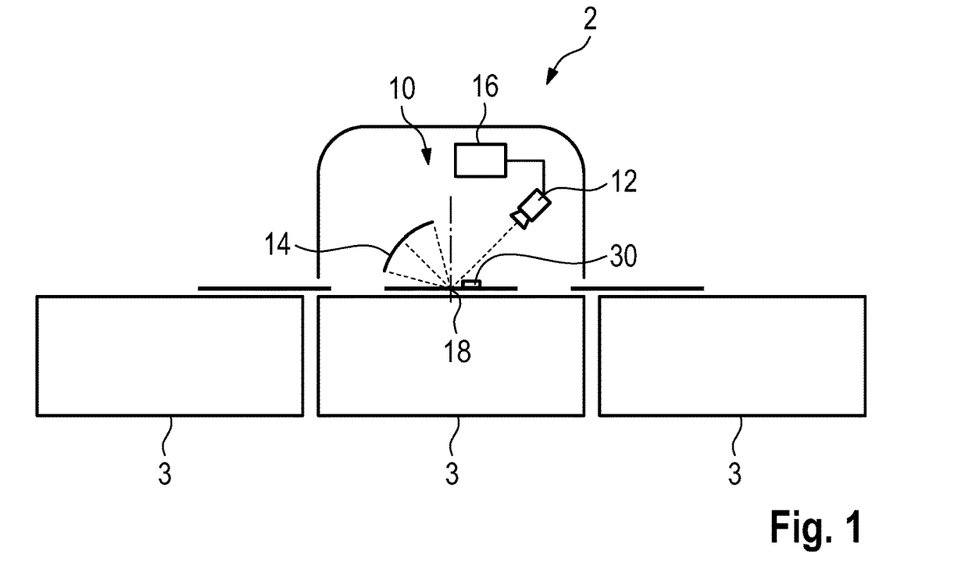
Figure 2:
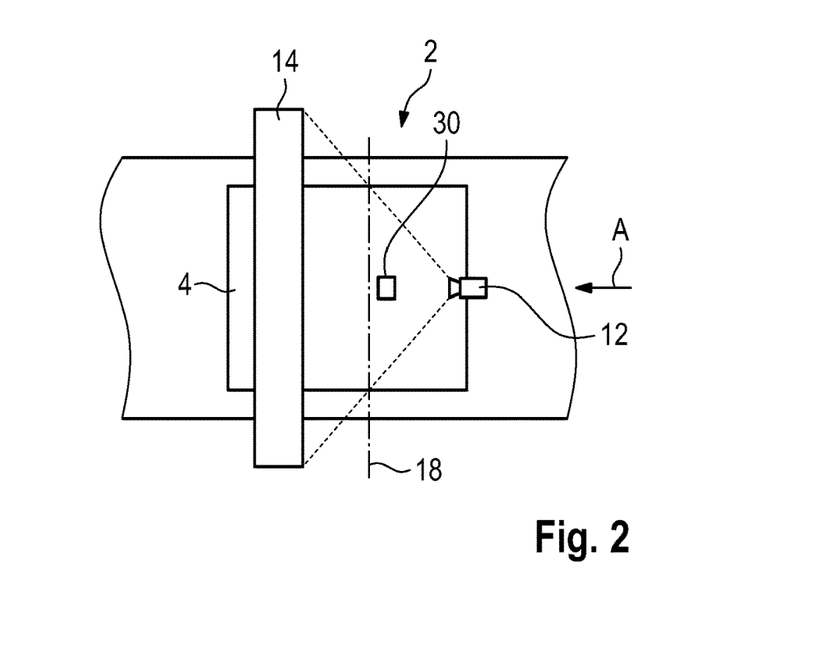
FIG. 2 schematically shows the image capturing system of FIG. 1 in a top view.

In FIG. 1, a quality control station 2 is schematically shown, which is employed in a sheet element processing machine of which conveyor tables 3 are shown in FIG. 2. The sheet element processing machine can process sheet elements 4 which are being transported in the direction of arrow A. The sheet elements 4 can be sheets of paper, cardboard, plastic foil or a similar material, or they can be in the form of a longer web. The sheet element processing machine can be a printing machine, a stamping machine, a laminating machine, a folding machine, a gluing machine, etc.

In the quality control station 2, an image capturing system 10 for determining the position of an embossed structure on the sheet element 4 moved though the quality control station 2 is implemented.

The image capturing system 10 comprises a camera 12, an illumination unit 14 and an image evaluation unit 16.

The camera 12 is here a line camera which is adapted for capturing line images of a viewing area 18 (a "line of interest") on the surface of the sheet elements 4. The viewing area 18 is an elongate zone which extends transversely to the direction A across the width of the sheet processing machine. The resolution of the camera 12 is such that elements of the order of 0.05 to 0.3 mm on the surface of the sheet elements 4 can be resolved, preferably of 0.1 mm.

Figure 3:
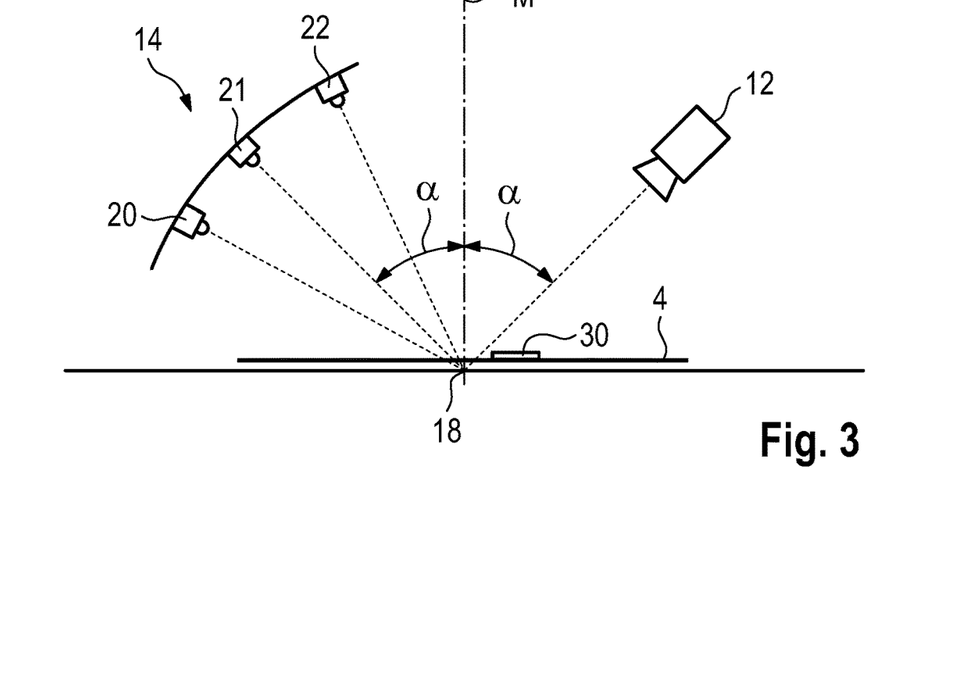
FIG. 3 schematically shows the optical components of a simplified image capturing system according to the invention.

The illumination unit 14 in FIG. 3 comprises a plurality of light sources 20, 21, 22 which extend transversely to the direction A. Each of the light sources 20, 21, 22 comprises a plurality of LEDs arranged adjacent each other along the length of the respective light source 20, 21, 22. In order to ensure that the intensity of the light generated by the light sources is (almost) constant along their length, a diffuser (not shown) is associated either with each of the light sources individually or with the illumination unit 14.

In the simplified embodiment shown in FIG. 3, the three light sources 20, 21, 22 are arranged on a circle or an arc, which is centered (in a cross section in a plane perpendicular to the line of interest) onto the line of interest (the viewing area 18 of camera 12). Thus, all three light sources 20, 21, 22 are at the same distance from the viewing area 18.

The positions and arrangements of the light sources 20, 21, 22 with respect to camera 12 and the line of interest 18 is explained with the aid of a median plane M shown in FIG. 3. Median plane M contains the line of interest 18 and extends perpendicularly to the mean surface of the sheet element 4 at the line of interest 18.

In the cross section of FIG. 3, the three light sources can be referred to for ease of reference as a lower light source 20, a middle light source 21 and an upper light source 22. The middle source 21 is arranged at an angle α with respect to median plane M which is the same angle with which camera 12 is arranged with respect to median plane M. Middle light source 21 and camera 12 are arranged on opposite sides of median plane M. Thus, assuming that light generated by light source 21 is reflected from the surface of sheet element 4 as a specular reflection, it directly falls into camera 12.

Since light sources 20 and 22 are arranged at angles with respect to median plane M, which are different from the angle α, light generated by any of these light sources and reflected from the surface of sheet element 4 as a specular reflection, cannot be detected by camera 12.

In practice, the reflection from the surface of sheet element 4 will not be (purely) specular but more or less diffuse. Nevertheless, the intensity of the reflected light originating from the light sources 20, 21, 22 will be different. In particular, the intensity of the light originating from light source 21 will be higher than the intensity of the light originating from light sources 20, 22.

With the aid of FIG. 4, the general principle of the image evaluation will now be described.

For this embodiment, multi-wavelength light sources are used.

Figure 4:
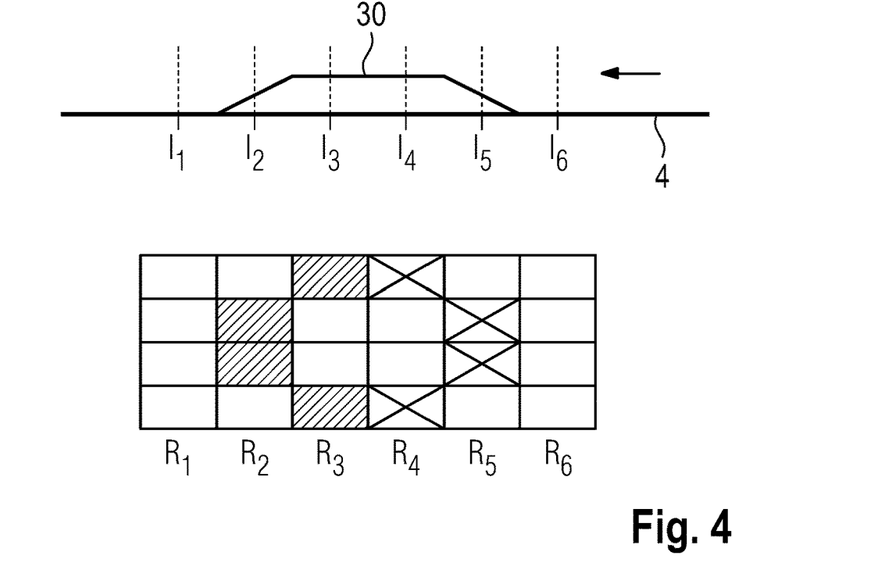
FIG. 4 schematically shows an embossed structure being moved through the viewing area of the camera of the image capturing system of FIG. 3, and the inclination-related parameters determined by the image capturing system.

In the upper half of FIG. 4, an embossed structure 30 is shown which here has the shape of a truncated cone. The width of the embossed structure 30 is here assumed to be four pixels (measured along the line of interest 18), and the length of the embossed structure (measure along the direction A) is assumed to correspond to four line images captured by camera 12. In other words, the length of the embossed structure corresponds to the distance by which sheet element 4 is being moved during the time four line images are being captured.

For each line image, all light sources 20, 21, 22 are being activated, and camera 12 captures a line image of the reflected light. Camera 12 is here assumed as being able to determine or understand which intensity originates from which light source 20, 21, 22. This can be achieved by using different wave length for the different light sources 20, 21, 22, and a color camera 12. Thus, this embodiment uses a hyper-spectral camera.

While an embodiment using different wavelengths does produce meaningful results to a certain extent, there is a disadvantage in practice. If the sheet elements have a colored surface, it does influence the intensity of the reflected light. Nevertheless, with the restriction to sheet elements of neutral color (either in white only or in gray only), this simplified embodiment does work and is being used here for explaining the basic principles on which the subject system and the subject method are based.

In a first line image, referred to as $I_1$, the embossed structure 30 is upstream of the line of interest. Thus, the surface of sheet element 4 is level. In view of light source 21 being arranged in a mirror-symmetric manner with respect to camera 12, the intensity of the light originating from light source 21 is higher than the intensity of the light originating from light sources 20, 22.

Image evaluation unit 16, with the aid of a look-up table, interprets this as "no inclination". This inclination-related parameter is shown in the lower half of FIG. 4 as empty pixels in row $R_1$.

A second line image $I_2$ is taken when the embossed structure 30 has been moved to the point where its "forward" inclined surface is at the line of interest 18. When being illuminated, it is no longer the reflected light originating from light source 21 which has the highest intensity but the light originating from light source 20 (because of the now changed orientation of the surface which reflects the light towards the camera).

Again, referring to the look-up table, image evaluation unit 16, interprets the fact that the highest intensity of the reflected light is associated with light source 20, as an "upwardly inclined" surface. This inclination-related parameter is shown in the lower half of FIG. 4 as black pixels in row $R_2$.

A third line image $I_3$ is taken when the embossed structure 30 has been moved to the point where its top surface is at the line of interest 18. When being illuminated, it is the middle light source 21 which results in the highest intensity of the reflected light at camera 12 at the center of the embossed structure 30 while it is the lower light source 20 which results in the highest intensity of the reflected light at the lateral portions of the embossed structure.

Again referring to the look-up table, image evaluation unit 16, transforms this distribution of the intensity into inclination-related parameters, namely "no inclination" for the two center pixels and "upward inclination" for the two pixels on either side of the center pixels.

A fourth line image $I_4$ is taken when the embossed structure 30 has been moved by another increment. When being illuminated, it again is the middle light source 21 which results in the highest intensity of the reflected light at camera 12 at the center of the embossed structure 30 while it is now the higher light source 22 which results in the highest intensity of the reflected light at the lateral portions of the embossed structure 30.

Again referring to the look-up table, image evaluation unit 16, transforms this distribution of the intensity into inclination-related parameters, namely "no inclination" for the two center pixels and "downward inclination" for the two pixels on either side of the center pixels. The inclination-related parameter "downward inclination" is indicated as a crossed pixel.

A fifth line image $I_5$ is taken when the embossed structure 30 has been moved by another increment. When being illuminated, it is the lateral pixels for which the highest intensity results from the middle light source 21, being interpreted as "no inclination", and the central pixels for which the highest intensity results from the upper light source 22, being interpreted as "downward inclination".

A sixth line image $I_6$ is taken when the embossed structure 30 has been moved by another increment. As the embossed structure now has completely passed the line of interest 18, it is again the middle light source 21 which results in the highest intensity of the light reflected towards camera 12. Accordingly, the image evaluation unit understands that there is "no inclination" at row $R_6$.

Image evaluation unit 16 thus is able to derive from the inclination-related parameter where an embossed structure 30 is present (by determining where it starts raising above the surface of the sheet element 4), how long and wide it is, etc. With a higher resolution than in the simplified example of FIG. 3, it is possible to determine the shape and to identify one of different embossed structures by image recognition. Should it be relevant, image evaluation unit 14 can also determine the height of an embossed structure based on a magnitude of the inclination and the length over which the inclination extends. For being able to determine the height of an embossed structure, the system needs to be calibrated in advance, in particular with respect to finding a zero height after an embossed structure has passed, and the look-up table is tuned.

As an alternative to the inclination-related parameter being "no inclination", "upward inclination" and "downward inclination", the pixels of the rows of the captured line images could be directly coded with the number of the light source which resulted in the highest intensity of the reflected light. If the captures line images shall be visualized, different colors can be used for visualizing different inclinations.

In practice, the system operates with speed of up to 15 m/s with which the sheet elements 4 are being moved. Camera 12 captures line images at rates of 10,000 to 40,000 line images per second, but higher rates can be used as well.

Figure 5:
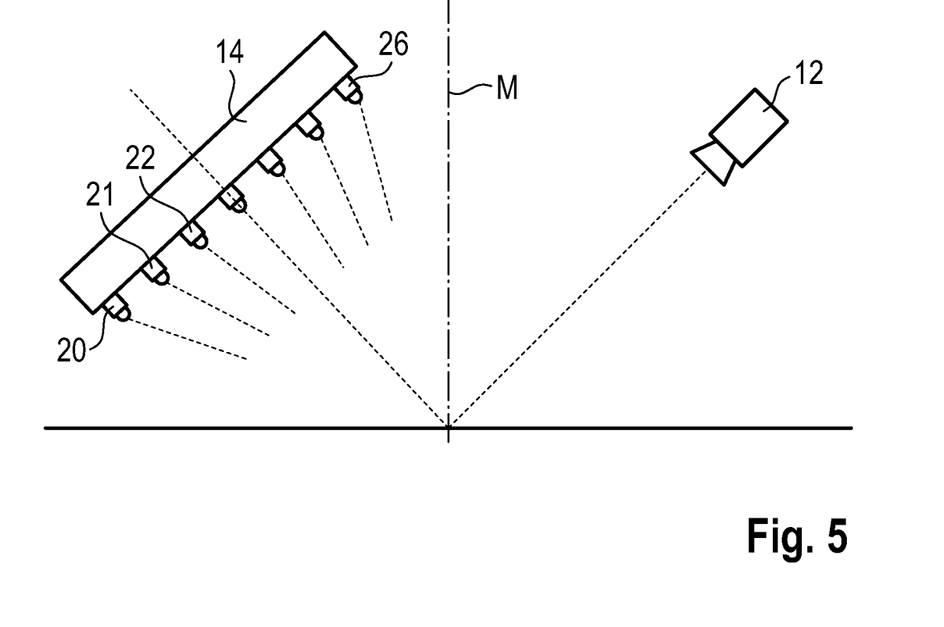
FIG. 5 schematically shows the optical components of the image capturing system according to the invention in a more elaborate embodiment.

A more elaborate embodiment of the image capturing system is shown in FIG. 5.

Generally speaking, an array of inclination-related parameters is obtained for a plurality of locations on the surface of sheet element 4. Based on this array of parameters, a subset of data will be generated which corresponds to a feature of the embossed structure. Then, the position of the feature of the embossed structure will be determined.

The difference over the embodiment of FIG. 3 is that illumination unit 14 comprises more than three light sources, namely seven light sources 20, 21, . . . 26. This allows distinguishing between different inclinations in finer steps and allows applying techniques with multiple look-up tables. The use of such multi LUT techniques will be explained later.

Another difference over the embodiment of FIG. 3 is that it is not possible to distinguish between the different light sources 20, 21, . . . 26 by their wavelength as they generate identical light. For each line image, a first sub-image is captured when only one of the light sources is active, then a second sub-image is captured when only a different one of the light sources is active, and so on.

The main advantage achieved herewith is that the identification of the embossed structure is independent of the color of the surface of the sheet element 4. Preferably, the LEDs are white for the camera.

It is possible to use a more elaborate strategy for activating the light sources. Depending on the circumstances, some light sources can be activated in pairs simultaneously, or the activation of certain light sources can be "skipped" (which means that also no corresponding sub-image is being captured) if it is clear for the image evaluation unit that this particular sub-image is not necessary for determining the inclination-related parameter.

Camera 12 here is a line camera.

The image evaluation unit 14 evaluates each sub-image. During this evaluation, it can be taken into account and be compensated that the sheet element and the embossed structure to be identified have slightly been moved between the individual sub-images. The compensation can in particular be done by resampling images to the same position.

An example of how the image evaluation unit 14 processes captured sub-images is explained with reference to FIG. 6 in which for a certain pixel of interest from the line image the seven measured intensities, in ordinate Int, are shown for the seven different light sources number 1 to number 7, depicted on the abscissa. The graph is the intensity profile for the certain pixel of interest. It is composed of the intensities measured in each of the seven sub-images taken when the line of interest 18 is being illuminated with one of the light sources 20, 21, . . . 26.

The image evaluation unit 14 evaluates, for each pixel of interest, which light source resulted in the highest intensity of the reflected light. The image evaluation unit 14 fits a mathematical curve C which best fits the different intensity measurements for this pixel of interest. The number of intensity measurements is directly the number of sub-images acquired sequentially. Here in FIG. 6, there are seven sub-images acquired. The maximum of this fitted curve is at an abscissa which is linked to the inclination of the sheet at this pixel location. Here in FIG. 6, it can be seen that the maximum intensity here is achieved (theoretically) with "light source 3.5" which would correspond to a light source being arranged between light sources 23 and 24 in FIG. 5. With the aid of the look-up table, the image evaluation unit 14 can now identify which inclination is present at this pixel of interest. By construction, the system measures only the part of the inclination in a plane P which is perpendicular to the line of interest, in other words the orthogonal projection of the local normal vector of the surface of the sheet element 4, onto plane P. The inclination-related output parameter can be e.g. the inclination in degree in respect to median plane M projected onto plane P.

Figure 6:
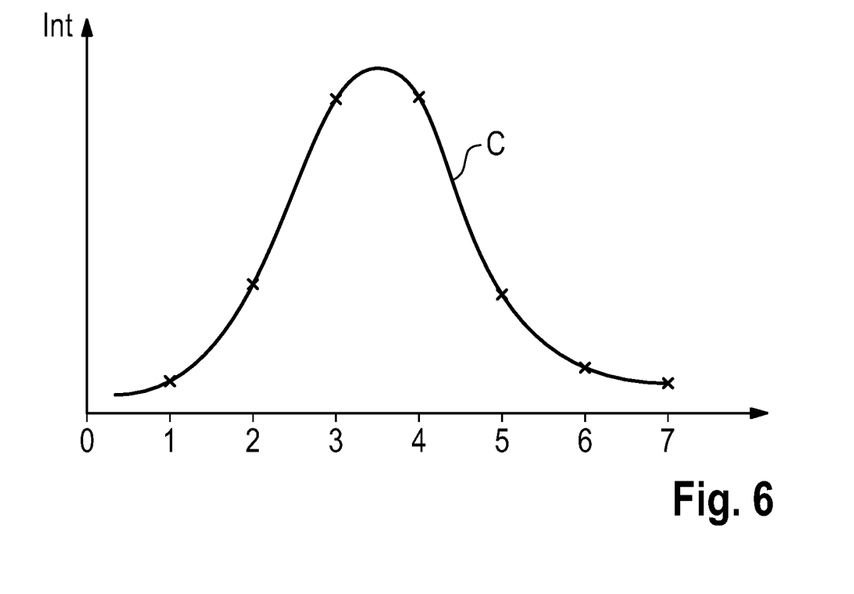
FIG. 6 schematically shows an evaluation of a captured sub-image, which is being made by the image evaluation unit.

The curve of FIG. 6 allows defining the inclination-related parameter for one pixel. The same evaluation is to be made for each pixel along the line of interest, and it is to be repeated after the sheet element 4 has been slightly moved, in order to arrive at a complete set of information regarding embossed structures present on the surface of the sheet element.

Thus, an array of inclination-related parameter data either for the entire surface of sheet element 4 or for a portion of interest is obtained.

Figure 7:
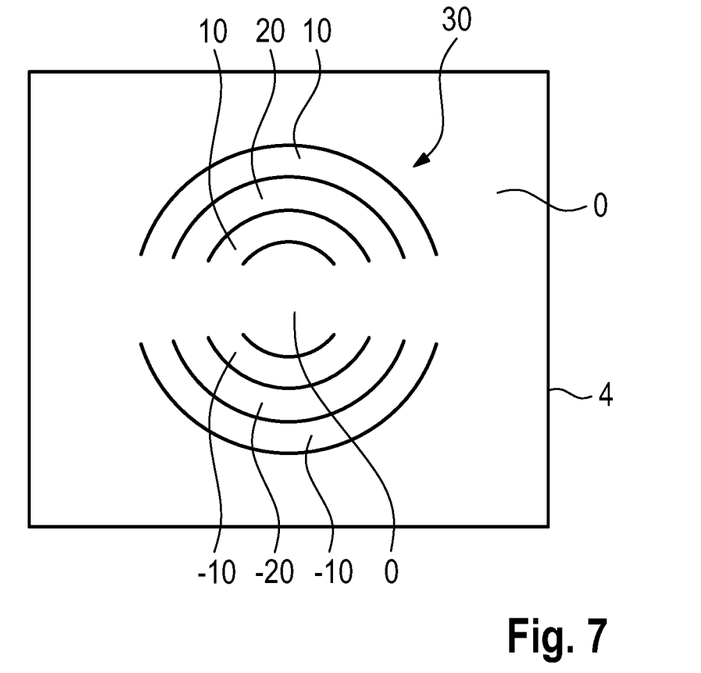
FIG. 7 shows a very schematic visualization of an embossed structure identified with the image capturing system and the image capturing method according to the invention.

Once the inclination-related parameter has been identified for all lines of interest (in the x direction) and along the lines of interest (in the y direction), it can be visualized. An example is shown in FIG. 7 where all areas having the same inclination are combined (here in increments of zero inclination, and inclination of 10°, an inclination of 20, an inclination of −10° and −20° with respect to sheet element 4 which is considered to be inclined at 0°). The resulting visualization is similar to contour lines on a topographical map.

The "gap" in the visualization at the 3 o'clock position and the 9 o'clock position is due to the fact that this part of the embossed feature has local normal vectors which are almost perpendicular to plan P, so that there is (almost) no slope signal in this region, and the slopes cannot be properly measured. As explained above, the measured slope is based on a projection of the local normal vector onto plane P. If the vector points towards plane P, then sensible measurement results cannot be obtained.

It is important to note that the position of any embossed structure on the sheet element 4 can be detected independent of any decorative effects overlaying the embossing (such as for example print, foil, hologram or varnish). This is because the method does not rely on measuring absolute reflectivity but a change of reflectivity profile of the surface due to a change in inclination.

However, the glossiness of the surface of the inspected sheet elements 4 results in a change of the profile of the intensity: a foil will have a sharp profile, but a diffuse substrate will have a more flat intensity profile ("flat intensity profile" here means: intensity for each light angle are more similar). Additionally the relation between the physical real inclination angle and the position of the maximum in profile intensity varies in function of the reflectivity type. In a preferred embodiment, to obtain an inclination-related parameter which is independent from the type of reflectivity (matte or shiny), the computation is separated into three steps:

1: analyze the intensity profile to determine where the position $X_{max}$ of the maximum is located (FIG. 6).

2: analyze the intensity profile to determine which look-up table to apply, in function of the reflectivity type (matte, shiny or a mix).

3: apply the determined look-up table on $X_{max}$ to output an inclination-related parameter.

This set of look-up tables (multi LUTs) is constructed by means of a calibration. As an example, five or ten look-up tables are built corresponding to five or ten type of reflectivity from matte to shiny. Then, the look-up tables link the profile to the slope value. The parameter which is being used for identifying the correct look-up table LUT to be used, is the sharpness (width) of the profile.

Instead of using multiple look-up tables, an appropriate formula or a mathematical computation can be used to achieve the same result.

If desired or necessary, two image capturing systems can be used which are arranged with the direction of their viewing areas inclined with respect to each other. As an example, an additional image capturing system of the type described above can be used, with the orientation of the viewing area 18 being different from the orientation of the viewing area of the first image capturing system.

It is also possible to have the viewing area 18 of a first image capturing system arranged at an angle of +45° with respect to the travel direction A of the sheet elements and the viewing area 18 of a second image capturing system arranged at an angle of −45° with respect to direction A.

The same result (differently oriented viewing areas) can be achieved by rotating the sheet element between two subsequent inspections.

The surface inspection system 10 can be part of a more complex inspection unit with other illumination units. In particular, light sources 12, 14 can be part of more complex illumination units which are used for detecting creases and embossed structures on the sheet elements.

Based on the previous Figures, it was described that the line images were obtained by illuminating the sheet elements with only one light source. In practice, the sheet elements are illuminated by different light sources in order to inspect the surface of the sheet elements in different respects. An example is a combination of bright-field illumination and dark-field illumination. The interlaced line images captured under each of the illumination conditions are in practice used for reconstructing a reconstructed BFI image (reconstructed image consisting of the line images captured under bright-field illumination) and a reconstructed DFI image (reconstructed image consisting of the line images captured under dark-field illumination), and these images will be analyzed by the image evaluation unit.

Figure 8:
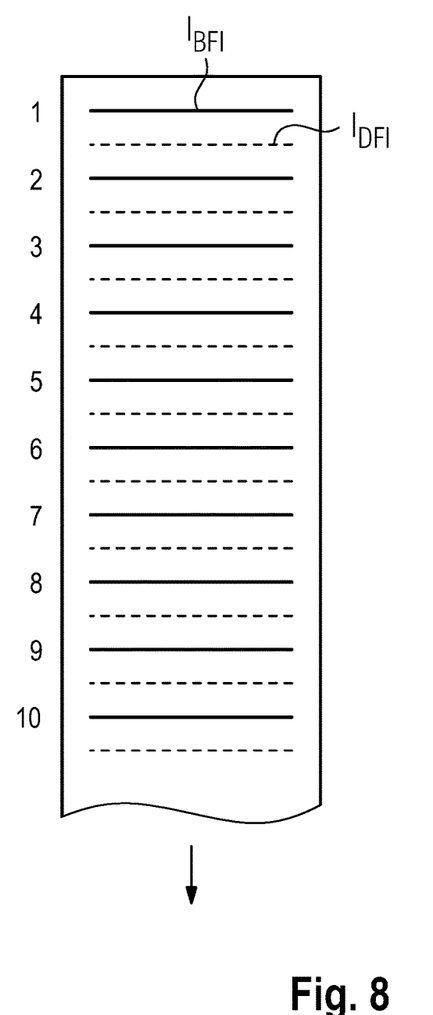
FIG. 8 schematically shows the different line images captured by the camera.

FIG. 8 schematically shows the interlaced line images $I_{BFI}$ (shown in normal lines) and $I_{DFI}$ (shown in dotted lines) captured by the camera. Here, only ten of the line images of each illumination condition are shown. In practice, several thousands of line images $I_{BFI}$, $I_{DFI}$ are being captured for each sheet element 4. Assuming that 4,000 line images $I_{BFI}$ and 4,000 line images $I_{DFI}$ are being captured for one sheet element 4 and that camera 12 is able to capture 80,000 line images per second, then ten sheet elements 4 per second can be processed.

Figure 9:
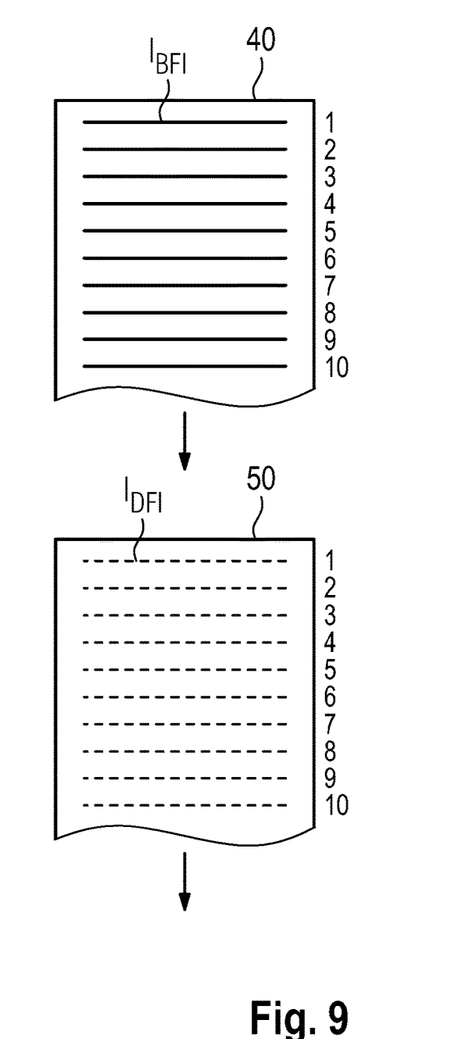
FIG. 9 schematically shows how reconstructed images are being generated based on the line images captured under different illumination conditions.

FIG. 9 schematically shows how a reconstructed BFI image 40 is reconstructed from the line images $I_{BFI}$ and how a reconstructed DFI image 50 is reconstructed from line images $I_{DFI}$.

Thus, a subset of inclination-related parameter data is obtained.

Should camera 12 capture line images under more than the two illumination conditions which are described here (BFI and DFI) and shown in FIG. 8, then the data captured by camera 12 would consist of three or more types of interlaced line images, and three or more reconstructed images would be reconstructed (one for each illumination condition).

Image evaluation unit 16 processes the reconstructed images 40, 50 (either entirely or in those portions which are of interest) in order to detect an item of interest. Here, the reconstructed images 40, 50 are compared in order to identify embossed surface portions. In particular, the position of a feature of interest (e.g. specific corners) is determined based on the subset of inclination-related parameter data.

The invention claimed is:

1. An image capturing system for determining the position of an embossed structure on a sheet element, wherein the sheet element is moved through a viewing area, the system comprising:
   a camera configured for capturing a line image of the surface of the sheet element in the viewing area, and an illumination unit comprising a plurality of light sources, each light source being configured for illuminating the viewing area to generate a respective line image across the viewing area that is captured by the camera;
   the light sources being arranged at respective different inclinations with respect to the viewing area; and
   an image evaluation unit configured to receive the line images from the light sources captured by the camera, configured to determine intensity of reflected light from each light source for each location in the viewing area, configured to construct an intensity profile based on the intensities of reflected light from the light sources for each location in the viewing area, and configured for determining an inclination-related parameter for each location of the surface of the sheet element in the viewing area and across the viewing area based on the intensity profile.

2. The image capturing system of claim 1, wherein the system is configured to determine an inclination-related parameter for each of a plurality of locations in the surface of the sheet element by determining for each of the plurality of the light sources an intensity value of light reflected by each of the plurality of locations.

3. The image capturing system of claim 2, wherein the system is configured to (i) generate an array of inclination-related parameter data corresponding to an area of the sheet element, (ii) identify a subset of the inclination-related parameter data corresponding to a feature of the embossed structure, (iii) determine the position of the feature of the embossed structure in the sheet from position data associated with a subset of the inclination-related parameter data.

4. The image capturing system of claim 1, wherein the light sources generate light at an identical wavelength of the light generated.

5. The image capturing system of claim 1, wherein the wavelength of the light generated by one of the light sources is different from the wavelength of the light generated by any other light source in the illumination unit.

6. The image capturing system of claim 1, wherein each light source comprises a plurality of LEDs arranged adjacent each other.

7. The image capturing system of claim 1, wherein the light sources are arranged in a same plane.

8. The image capturing system according to claim 1, wherein the illumination unit comprises a diffuser.

9. The image capturing system according to claim 1, wherein the camera is a line camera.

10. The image capturing system according to claim 1, wherein the camera is a color camera.

11. The image capturing system of according to claim 1, further comprising a synchronizing module configured for synchronizing activation of the light sources with the camera.

12. The image capturing system according to claim 11, wherein the synchronizing module is linked to movement of a sheet element.

13. A method of determining the position of an embossed structure on a sheet element by using an image capturing system according to claim 1, the method comprising the following steps:
directing light from a first one of the light sources onto the viewing area, and using the camera to capture a first line image ($I_1$) of the viewing area;
directing light from a second one of the light sources onto the viewing area, and using the camera to capture a second line image ($I_2$) of the viewing area,
optionally, directing light from at least a further one of the light sources onto the viewing area, and using the camera to capture a corresponding line image (In) of the viewing area,
communicating the captured line images to the image evaluation unit, and
using the image evaluation unit for determining an inclination-related parameter for the surface of the sheet element in the viewing area across the viewing area.

14. The method of claim 13, further comprising obtaining an inclination-related parameter for each of a plurality of locations in the surface of the sheet element by determining by the evaluation unit for each of the plurality of the light sources an intensity value of light reflected by that location.

15. The method of claim 14, further comprising (i) generating an array of inclination-related parameter data corresponding to an area of the sheet element, (ii) identifying a subset of the inclination-related parameter data corresponding to a feature of the embossed structure, (iii) and determining the position of the feature of the embossed structure in the sheet from position data associated with a subset of the inclination-related parameter data.

16. The method of claim 13, wherein the different light sources are activated one after the other.

17. The method of claim 13, wherein the different light sources are activated simultaneously.

18. The method of claim 13, wherein the inclination-related parameter is an inclination.

19. The method of claim 13, wherein the inclination-related parameter is determined by using a look-up table.

20. The method of claim 19, further comprising providing a plurality of look-up tables and an appropriate table is chosen depending on parameters of the surface of the sheet element.

21. The method of claim 13, wherein two different viewing areas are used which are arranged at a different angle with respect to a direction of movement of the sheet elements.

22. The method of claim 13, further comprising considering a surface finish of the surface of the sheet element when determining the inclination-related parameter.

23. The method of claim 22, wherein the surface finish considered includes color reflectivity or glossiness.

* * * * *